(12) United States Patent
Li et al.

(10) Patent No.: US 8,545,971 B2
(45) Date of Patent: *Oct. 1, 2013

(54) POLYMERIC COMPOSITIONS COMPRISING POLYLACTIC ACID AND METHODS OF MAKING AND USING SAME

(75) Inventors: Fengkui Li, Houston, TX (US); Tim J. Coffy, Houston, TX (US); Michel Daumerie, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 906 days.

This patent is subject to a terminal disclaimer.

(21) Appl. No.: 12/165,059

(22) Filed: Jun. 30, 2008

(65) Prior Publication Data

US 2009/0324911 A1    Dec. 31, 2009

(51) Int. Cl.
  *B32B 7/02*  (2006.01)
  *B29C 63/00*  (2006.01)

(52) U.S. Cl.
  USPC ............ 428/213; 428/34.6; 428/98; 428/212; 428/343; 428/354; 528/354; 528/361; 528/425; 525/55; 525/63; 525/88; 525/93; 525/166; 525/190; 525/240; 525/396; 264/171.1; 264/173.12; 264/172.11

(58) Field of Classification Search
  USPC ............... 525/55, 63, 64, 88, 93, 166, 190, 525/191, 240, 396; 428/34.6, 35.9, 36.7, 428/98, 101, 212, 213, 214, 215, 216, 343, 428/354, 355 AC, 355 EP, 355 R, 430; 528/354, 361, 425
  See application file for complete search history.

(56) References Cited

U.S. PATENT DOCUMENTS

| | | | |
|---|---|---|---|
| 2,758,987 A | 8/1956 | Saizberg | |
| 3,923,726 A | 12/1975 | Benz | |
| 4,298,718 A | 11/1981 | Mayr et al. | |
| 4,543,399 A | 9/1985 | Jenkins, III et al. | |
| 4,544,717 A | 10/1985 | Mayr et al. | |
| 4,588,790 A | 5/1986 | Jenkins, III et al. | |
| 4,767,735 A | 8/1988 | Ewen et al. | |
| 4,794,096 A | 12/1988 | Ewen | |
| 4,797,468 A | 1/1989 | De Vries | |
| 4,975,403 A | 12/1990 | Ewen | |
| 5,028,670 A | 7/1991 | Chinh et al. | |
| 5,132,172 A * | 7/1992 | Simpson et al. | ............. 428/336 |
| 5,158,920 A | 10/1992 | Razavi | |

(Continued)

FOREIGN PATENT DOCUMENTS

WO    WO2008/023758    *    2/2008

OTHER PUBLICATIONS

Chawla, Journal of Applied Polymer Science, vol. 105, Issue 6, pp. 3578-3587, Jun. 5, 2007.*

(Continued)

*Primary Examiner* — Maria Veronica Ewald
*Assistant Examiner* — Nicole T Gugliotta

(57) ABSTRACT

A multi-component article comprising a first component comprising a biodegradable polymer, and a second component comprising a polyolefin and a reactive modifier. A method of preparing a multi-layer film comprising coextruding first and second film layers, wherein the first layer comprises a polylactic acid and the second layer comprises a polyolefin and an epoxy-functionalized polyolefin. A method of preparing a multi-component fiber comprising coextruding a core component and a sheath component, wherein the core component comprises a polyolefin and an epoxy-functionalized polyolefin and the sheath component comprises a polylactic acid.

22 Claims, 4 Drawing Sheets

(56) References Cited

U.S. PATENT DOCUMENTS

| | | |
|---|---|---|
| 5,310,865 A | 5/1994 | Enomoto et al. |
| 5,317,036 A | 5/1994 | Brady, III et al. |
| 5,352,749 A | 10/1994 | DeChellis et al. |
| 5,405,922 A | 4/1995 | DeChellis et al. |
| 5,416,228 A | 5/1995 | Ewen et al. |
| 5,436,304 A | 7/1995 | Griffin et al. |
| 5,456,471 A | 10/1995 | MacDonald |
| 5,462,999 A | 10/1995 | Griffin et al. |
| 5,470,944 A | 11/1995 | Bonsignore |
| 5,508,378 A | 4/1996 | Ohara et al. |
| 5,525,678 A | 6/1996 | Mink et al. |
| 5,616,661 A | 4/1997 | Eisinger et al. |
| 5,627,242 A | 5/1997 | Jacobsen et al. |
| 5,665,818 A | 9/1997 | Tilston et al. |
| 5,668,228 A | 9/1997 | Chinh et al. |
| 5,677,375 A | 10/1997 | Rifi et al. |
| 5,770,682 A | 6/1998 | Ohara et al. |
| 5,789,502 A | 8/1998 | Shamshoum et al. |
| 5,807,800 A | 9/1998 | Shamshoum et al. |
| 5,821,327 A | 10/1998 | Oota et al. |
| 5,968,864 A | 10/1999 | Shamshoum et al. |
| 6,090,325 A | 7/2000 | Wheat et al. |
| 6,147,173 A | 11/2000 | Holtcamp |
| 6,180,735 B1 | 1/2001 | Wenzel |
| 6,207,606 B1 | 3/2001 | Lue et al. |
| 6,211,105 B1 | 4/2001 | Holtcamp |
| 6,225,251 B1 | 5/2001 | Shamshoum et al. |
| 6,242,545 B1 | 6/2001 | Jejelowo et al. |
| 6,245,437 B1 * | 6/2001 | Shiiki et al. ............... 428/483 |
| 6,245,705 B1 | 6/2001 | Kissin |
| 6,245,868 B1 | 6/2001 | Agapiou et al. |
| 6,248,845 B1 | 6/2001 | Loveday et al. |
| 6,271,323 B1 | 8/2001 | Loveday et al. |
| 6,274,684 B1 | 8/2001 | Loveday et al. |
| 6,300,436 B1 | 10/2001 | Agapiou et al. |
| 6,339,134 B1 | 1/2002 | Crowther et al. |
| 6,340,730 B1 | 1/2002 | Murray et al. |
| 6,346,586 B1 | 2/2002 | Agapiou et al. |
| 6,359,072 B1 | 3/2002 | Whaley |
| 6,380,328 B1 | 4/2002 | McConville et al. |
| 6,420,580 B1 | 7/2002 | Holtcamp et al. |
| 6,432,860 B1 | 8/2002 | Shamshoum et al. |
| 6,468,936 B1 | 10/2002 | Reddy et al. |
| 6,503,990 B2 | 1/2003 | Kasehagen et al. |
| 6,506,873 B1 | 1/2003 | Ryan |
| 6,579,962 B1 | 6/2003 | Wheat et al. |
| 6,653,254 B1 | 11/2003 | Shamshoum et al. |
| 6,777,366 B2 | 8/2004 | Gauthier et al. |
| 6,777,367 B2 | 8/2004 | Gauthier et al. |
| 7,056,991 B2 | 6/2006 | Tharappel et al. |
| 2004/0054089 A1 * | 3/2004 | Wakabayashi et al. ....... 525/298 |
| 2004/0121172 A1 | 6/2004 | Hofman |
| 2005/0191490 A1 * | 9/2005 | Ton-That et al. ............. 428/407 |
| 2006/0012072 A1 | 1/2006 | Hagewood |
| 2006/0269755 A1 * | 11/2006 | Song .......................... 428/411.1 |
| 2008/0076880 A1 * | 3/2008 | Nakagawa et al. ........... 525/190 |
| 2009/0264591 A1 * | 10/2009 | Sano et al. ...................... 525/93 |

OTHER PUBLICATIONS

NatureWorks PLA Polymer 3051D Injection Molding Process Guide, Copyright 2005, NatureWorks LLC.*

Product Sheet for Total Petrochemicals USA, Inc. 3270. Jan. 2007.*

Patent application entitled "Polymeric blends and methods of using same" by Fengkui Li, et al., filed Jun. 30, 2008 as U.S. Appl. No. 12/165,037.

Patent application entitled "Compatibilized polypropylene and polylactic acid blends and methods of making and using same" by Fengkui Li, et al., filed Jun. 30, 2008 as U.S. Appl. No. 12/165,051.

Chen, Li-Feng, et al., "Melt grafting of glycidyl methacrylate onto polypropylene and reactive compatibilization of rubber toughened polypropylene," Jun. 1996, pp. 1594-1607, vol. 36, No. 12, Polymer Engineering and Science.

Gallucci, Robert R., et al., "Preparation and reactions of epoxy-modified polyethylene," Journal of Applied Polymer Science, 1982, pp. 425-437, vol. 27, John Wiley & Sons, Inc.

Sun, Yi-Jun, et al., "Free redical grafting of glycidyl methacrylate onto polypropylene in a co-rotating twin screw extruder," Journal of Applied Polymer Science, 1995, pp. 1043-1054, vol. 57, John Wiley & Sons, Inc.

Sun, Yi-Jun, et al., "Melt free-radical grafting of glycidyl methacrylate onto polypropylene," Die Angewandte Makromolekulare Chemie, 1995, pp. 1-13, vol. 229, Hüthig & Wepf Verlag, Zug.

Wong, Betty, et al., "Melt rheology of graft modified polypropylene," Polymer, 1997, pp. 2781-2789, vol. 38, No. 11, Elsevier Science Ltd, Great Britain.

Yu Yibing, et al.; "Studies on Photografting of Trimethylol Propane Triacrylate Onto the Surface of LDPE Films"; Key Laboratory of Science and Technology of Controllable Chemical Reactions, Ministry of Education, College of Material Science and Engineering, Bejing University of Chemical Technology, Bejing, China; ACTA Polymerica Sinica, vol. 3; Jun. 2006; pp. 455-460.

* cited by examiner

US 8,545,971 B2

POLYMERIC COMPOSITIONS COMPRISING POLYLACTIC ACID AND METHODS OF MAKING AND USING SAME

CROSS-REFERENCE TO RELATED APPLICATIONS

The subject matter of the present application is related to U.S. patent application Ser. No. 12/165,037 entitled "Polymeric Blends and Methods of Using Same" and U.S. patent application Ser. No. 12/165,051 and entitled "Compatibilized Polypropylene and Polylactic Acid Blends and Methods of Making and Using Same," both filed concurrently herewith and are hereby incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

This disclosure relates to polymeric compositions. More specifically, this disclosure relates to polymeric compositions comprising a biodegradable polymer.

2. Background

Synthetic polymeric materials, such as polypropylene and polyethylene resins, are widely used in the manufacturing of a variety of end-use articles ranging from medical devices to food containers. Many industries, such as the packaging industry, utilize polypropylene materials in various manufacturing processes to create a variety of finished goods including bicomponent fibers and multi-layer films.

While articles constructed from synthetic polymeric materials have widespread utility, one drawback to their use is that these materials tend to remain semipermanently in a natural environment. In response to environmental concerns, interest in the production and utility of more readily biodegradable polymeric materials has been increasing. These materials, also known as "green materials," may undergo accelerated degradation in a natural environment. The utility of these biodegradable polymeric materials is often limited by their poor mechanical and/or physical properties. Thus, a need exists for biodegradable polymeric compositions having desirable physical and/or mechanical properties.

SUMMARY

Disclosed herein is a multi-component article comprising a first component comprising a biodegradable polymer, and a second component comprising a polyolefin and a reactive modifier.

Also disclosed herein is a method of preparing a multi-layer film comprising coextruding first and second film layers, wherein the first layer comprises a polylactic acid and the second layer comprises a polyolefin and an epoxy-functionalized polyolefin.

Further disclosed herein is a method of preparing a multi-component fiber comprising coextruding a core component and a sheath component, wherein the core component comprises a polyolefin and an epoxy-functionalized polyolefin and the sheath component comprises a polylactic acid.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
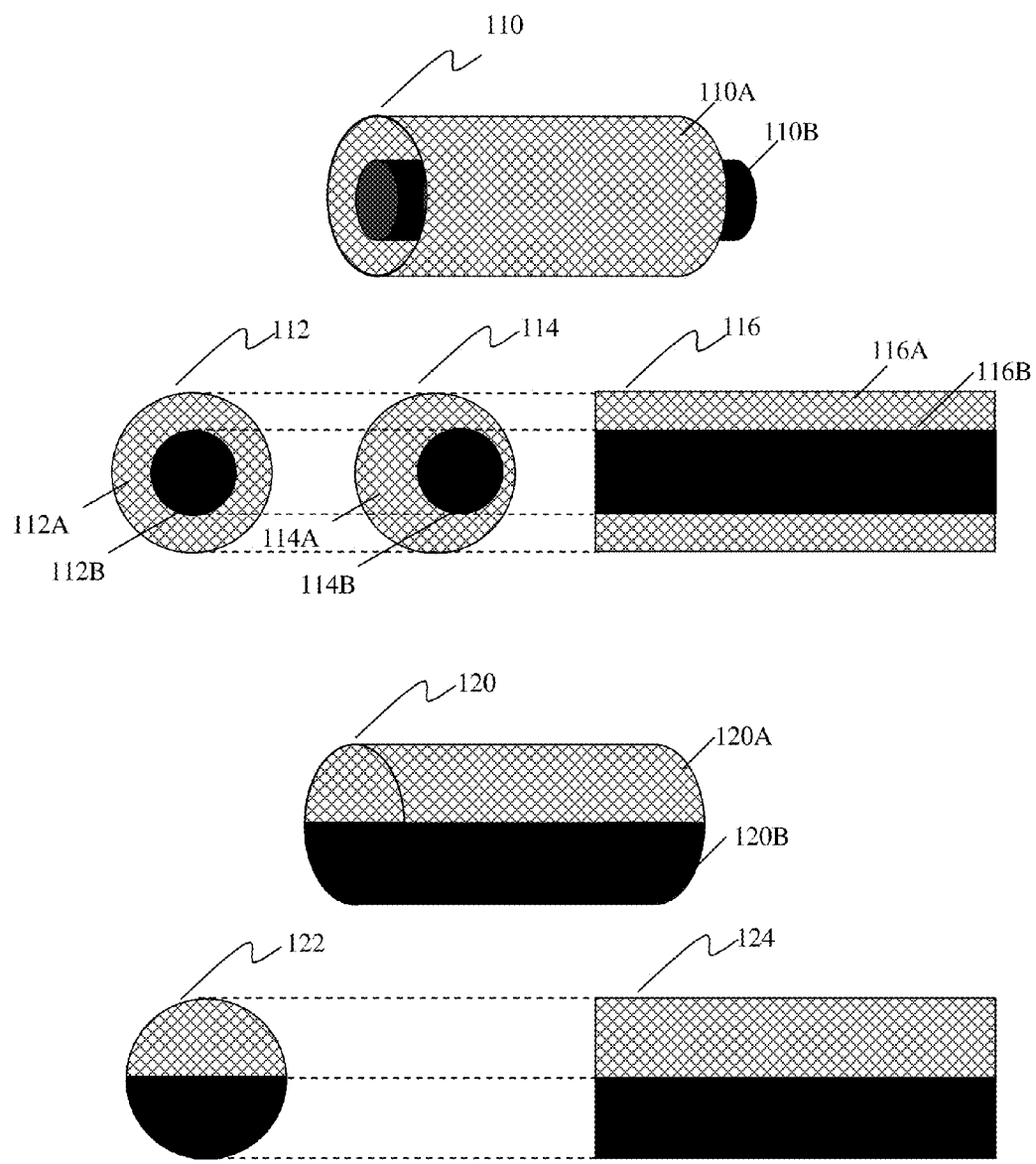
FIG. 1 is an illustration of embodiments of bicomponent fibers.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are multi-component articles wherein at least one component comprises a biodegradable polymer and at least one component comprises a polyolefin and a reactive modifier. Herein biodegradable refers to materials that are capable of being broken down especially into innocuous products by the action of living things. In an embodiment, the multi-component article may comprise additional components wherein the component comprising a polyolefin and a reactive modifier is disposed so as to adhere the various components to each other. In an embodiment, the biodegradable polymer comprises polylactic acid (PLA) and the multi-component article comprises at least one component comprising PLA and at least one component comprising a polyolefin and a reactive modifier. The various components of the multi-component article will be described in more detail later herein. The multi-component articles of the type described herein may display desirable physical and/or mechanical properties when compared to articles having components comprising a polyolefin or polylactic acid alone, or having at least one component comprising a polyolefin, at least one component comprising a biodegradable polymer and lacking a component comprising a reactive modifier.

A multi-component article may comprise at least one component comprising a polyolefin. In an embodiment, the polyolefin is polypropylene. In an alternative embodiment, the polyolefin is polyethylene.

In an embodiment, the polyolefin is polypropylene. The polypropylene may be a homopolymer provided however that the homopolymer may contain up to 5% of another alpha-olefin, including but not limited to $C_2$-$C_8$ alpha-olefins such as ethylene and 1-butene. Despite the potential presence of small amounts of other alpha-olefins, the polypropylene is generally referred to as a polypropylene homopolymer.

In an embodiment, the polypropylene homopolymer is present in a component of the multi-component article in an amount of from 1 weight percent (wt. %) to 99 wt. % by total weight of the multi-component article, alternatively from 5 wt. % to 70 wt. %, alternatively from 10 wt. % to 50 wt. %.

Polypropylene homopolymers suitable for use in this disclosure may include any type of polypropylene known in the art with the aid of this disclosure. For example, the polypropylene homopolymer may be atactic polypropylene, isotactic polypropylene, hemi-isotactic, syndiotactic polypropylene, or combinations thereof. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain. In hemi-isotactic polymer, every other repeat unit has a random substituent.

In an embodiment, a polypropylene suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melting temperature of from 150° C. to 170° C., alternatively from 155° C. to 168° C., and alternatively from 160° C. to 165° C. as determined by differential scanning calorimetry; a melt flow rate of from 0.5 g/10 min. to 30 g/10 min., alternatively from 1.0 g/10min. to 15 g/10 min., and alternatively from 1.5 g/10 min. to 5.0 g/10 min. as determined in accordance with ASTM D1238 condition "L"; a tensile modulus of from 200,000 psi to 350,000 psi; alternatively from 220,000 psi to 320,000 psi, and alternatively from 250,000 psi to 320,000 psi as determined in accordance with ASTM D638; a tensile stress at yield of from 3,000 psi to 6,000 psi, alternatively from 3,500 psi to 5,500 psi, and alternatively from 4,000 psi to 5,500 psi as determined in accordance with ASTM D638; a tensile strain at yield of from 5% to 30%, alternatively from 5% to 20%, and alternatively from 5% to 15% as determined in accordance with ASTM D638; a flexural modulus of from 120,000 psi to 330,000 psi, alternatively from 190,000 psi to 310,000 psi, and alternatively of from 220,000 psi to 300,000 psi as determined in accordance with ASTM D790; a Gardner impact of from 3 in-lb to 50 in-lb, alternatively from 5 in-lb to 30 in-lb, and alternatively from 9 in-lb to 25 in-lb as determined in accordance with ASTM D2463; a Notched Izod Impact Strength of from 0.2 ft lb/in to 20 ft lb/in, alternatively from 0.5 ft lb/in to 15 ft lb/in, and alternatively from 0.5 ft lb/in to 10 ft lb/in as determined in accordance with ASTM D256A; a hardness shore D of from 30 to 90, alternatively from 50 to 85, and alternatively from 60 to 80 as determined in accordance with ASTM D2240; and a heat distortion temperature of from 50° C. to 125° C., alternatively from 80° C. to 115° C., and alternatively from 90° C. to 110° C. as determined in accordance with ASTM D648.

Examples of polypropylene homopolymers suitable for use in this disclosure include without limitation 3371, 3271, 3270, and 3276, which are polypropylene homopolymers commercially available from Total Petrochemicals USA, Inc. In an embodiment, the polypropylene homopolymer (e.g., 3371) has generally the physical properties set forth in Table 1.

TABLE 1

| Properties | 3371 Typical Value | Test Method |
|---|---|---|
| Physical | | |
| Density, g/cc | 0.905 | ASTM D1505 |
| Melt Flow Rate (MFR), g/10 min. | 2.8 | ASTM D1238 condition "L" |
| Mechanical | | |
| Tensile Modulus, psi | 235,000 | ASTM D638 |
| Tensile Stress at Yield, psi | 5,100 | ASTM D638 |
| Tensile Strain at Yield, % | 7.5 | ASTM D638 |
| Flexural Modulus, psi | 202,000 | ASTM D790 |
| Impact | | |
| Gardner impact, in-lb | 149.2 | ASTM D2463 |
| Notched Izod Impact Strength, ft lb/in | 0.69 | ASTM D256A |
| Hardness | | |
| Hardness Shore D | 75 | ASTM D2240 |
| Thermal | | |
| Heat distortion temperature, ° F. | 207 | ASTM D648 |
| Melting Temperature (DSC), ° F. | 325 | DSC |

In another embodiment, the polypropylene may be a high crystallinity polypropylene homopolymer (HCPP). The HCPP may contain primarily isotactic polypropylene. The isotacticity in polymers may be measured via $^{13}$C NMR spectroscopy using meso pentads and can be expressed as percentage of meso pentads (% mmmm). As used herein, the term "meso pentads" refers to successive methyl groups located on the same side of the polymer chain. In an embodiment, the HCPP has a meso pentads percentage of greater than 97%, or greater than 98%, or greater than 99%. The HCPP may comprise some amount of atactic or amorphous polymer. The atactic portion of the polymer is soluble in xylene, and is thus termed the xylene soluble fraction (XS %). In determining XS %, the polymer is dissolved in boiling xylene and then the solution cooled to 0° C. that results in the precipitation of the isotactic or crystalline portion of the polymer. The XS % is that portion of the original amount that remained soluble in the cold xylene. Consequently, the XS % in the polymer is indicative of the extent of crystalline polymer formed. The total amount of polymer (100%) is the sum of the xylene soluble fraction and the xylene insoluble fraction, as determined in accordance with ASTM D5492-98. In an embodiment, the HCPP has a xylene soluble fraction of less than 1.5%, or less than 1.0%, or less than 0.5%.

In an embodiment, an HCPP suitable for use in this disclosure may have a density of from 0.895 g/cc to 0.920 g/cc, alternatively from 0.900 g/cc to 0.915 g/cc, and alternatively from 0.905 g/cc to 0.915 g/cc as determined in accordance with ASTM D1505; a melt flow rate of from 0.5 g/10 min. to 30 g/10 min., alternatively from 1.0 g/10 min. to 15 g/10 min., and alternatively from 1.5 g/10 min. to 5.0 g/10 min. as determined in accordance with ASTM D1238; a secant modulus in the machine direction (MD) of from 350,000 psi to 420,000 psi; alternatively from 380,000 psi to 420,000 psi, and alternatively from 400,000 psi to 420,000 psi as determined in accordance with ASTM D882; a secant modulus in the transverse direction (TD) of from 400,000 psi to 700,000 psi, alternatively from 500,000 psi to 700,000 psi, and alternatively from 600,000 psi to 700,000 psi as determined in accordance with ASTM D882; a tensile strength at break in the MD of from 19,000 psi to 28,000 psi, alternatively from 22,000 psi to 28,000 psi, and alternatively from 25,000 psi to 28,000 psi as determined in accordance with ASTM D882; a tensile strength at break in the TD of from 20,000 psi to 40,000 psi, alternatively from 30,000 psi to 40,000 psi, and alternatively of from 35,000 psi to 40,000 psi as determined in accordance with ASTM D882; an elongation at break in the MD from 50% to 200%, alternatively from 100% to 180%, and alternatively from 120% to 150% as determined in accordance with ASTM D882; an elongation at break in the TD of from 50% to 150%, alternatively from 60% to 100%, and alternatively from 80% to 100% as determined in accordance with ASTM D882; a melting temperature of from 150° C. to 170° C., alternatively from 155° C. to 170° C., and alternatively from 160° C. to 170° C. as determined by differential scanning calorimetry; a gloss at 45° of from 70 to 95, alternatively from 75 to 90, and alternatively from 80 to 90 as determined in accordance with ASTM D2457; a percentage haze of from 0.5% to 2.0%, alternatively from 0.5% to 1.5%, and alternatively from 0.5% to 1.0% as determined in accordance with ASTM D1003; and a water vapor transmission rate of from 0.15 to 0.30 g-mil/100 in$^2$/day, alternatively from 0.15 to 0.25 g-mil/100 in$^2$/day, and alternatively from 0.20 to 0.21 g-mil/100 in$^2$/day as determined in accordance with ASTM F-1249-90.

An example of an HCPP suitable for use in this disclosure includes without limitation 3270, which is an HCPP commercially available from Total Petrochemicals USA, Inc. The HCPP (e.g., 3270) may generally have the physical properties set forth in Table 2.

TABLE 2

| Properties | 3270 Typical Value | Test Method |
|---|---|---|
| Physical | | |
| Density, g/cc | 0.910 | ASTM D1505 |
| Melt Mass-Flow Rate (MFR) (230° C./2.16 kg), g/10 min. | 2.0 | ASTM D1238 |
| BOPP Mechanical | | |
| Secant Modulus MD, psi | 420,000 | ASTM 882 |
| Secant Modulus TD, psi | 700,000 | ASTM 882 |
| Tensile Strength at Break MD, psi | 28,000 | ASTM 882 |
| Tensile Strength at Break TD, psi | 39,000 | ASTM 882 |
| Elongation at Break MD, % | 150 | ASTM 882 |
| Elongation at Break TD, % | 60 | ASTM 882 |
| Thermal | | |
| Melting Temperature, ° F. | 329 | DSC |
| Optical | | |
| Gloss (45°) | 85 | ASTM D2457 |
| Haze, % | 1.0 | ASTM D1003 |
| Barrier | | |
| Water Vapor Transmission, 100° F., 90% R.H, g-mil/100 in$^2$/day | 0.2 | ASTM F1249-90 |

In another embodiment, the polypropylene may be a polypropylene copolymer, for example a polypropylene heterophasic copolymer (PPHC), also known as a polypropylene impact compolymer, wherein a polypropylene homopolymer phase or component is joined to a copolymer phase or component. The PPHC may comprise from greater than 6.5 wt. % to less than 11.5 wt. % ethylene by total weight of the PPHC, alternatively from 8.5 wt. % to less than 10.5 wt. %, alternatively from 9.5 wt. %.

The copolymer phase of a PPHC may be a random copolymer of propylene and ethylene, also referred to as an ethylene/propylene rubber (EPR). PP heterophasic copolymers show distinct homopolymer phases that are interrupted by short sequences or blocks having a random arrangement of ethylene and propylene. In comparison to random copolymers, the block segments comprising the EPR may have certain polymeric characteristics (e.g., intrinsic viscosity) that differ from that of the copolymer as a whole. Without wishing to be limited by theory, the EPR portion of the PPHC has rubbery characteristics which, when incorporated within the matrix of the homopolymer component, may function to provide increased impact strength to the PPHC. In an embodiment, the EPR portion of the PPHC comprises greater than 14 wt. % of the PPHC, alternatively greater than 18 wt. % of the PPHC, alternatively from 14 wt. % to 18 wt. % of the PPHC.

The amount of ethylene present in the EPR portion of the PPHC may be from 38 wt. % to 50 wt. %, alternatively from 40 wt. % to 45 wt. % based on the total weight of the EPR portion. The amount of ethylene present in the EPR portion of the PPHC may be determined spectrophotometrically using a fourier transform infrared spectroscopy (FTIR) method. Specifically, the FTIR spectrum of a polymeric sample is recorded for a series of samples having a known EPR ethylene content. The ratio of transmittance at 720 cm$^{-1}$/900 cm$^{-1}$ is calculated for each ethylene concentration and a calibration curve may then be constructed. Linear regression analysis on the calibration curve can then be carried out to derive an equation that is then used to determine the EPR ethylene content for a sample material.

The EPR portion of the PPHC may exhibit an intrinsic viscosity different from that of the propylene homopolymer component. Herein intrinsic viscosity refers to the capability of a polymer in solution to increase the viscosity of said solution. Viscosity is defined herein as the resistance to flow due to internal friction. In an embodiment, the intrinsic viscosity of the EPR portion of the PPHC may be greater than 2.0 dl/g, alternatively from 2.0 dl/g to 3.0 dl/g, alternatively from 2.4 dl/g to 3.0 dl/g, alternatively from 2.4 dl/g to 2.7 dl/g, alternatively from 2.6 dl/g to 2.8 dl/g. The intrinsic viscosity of the EPR portion of the PPHC is determined in accordance with ASTM D5225.

In an embodiment, the PPHC may have a melt flow rate (MFR) of from 65 g/10 min. to 130 g/10 min., alternatively from 70 g/10 min. to 120 g.10 min., alternatively from 70 g/10 min. to 100 g/10 min., alternatively from 70 g/10 min. to 90 g/10 min., alternatively from 75 g/10 min. to 85 g/10 min., alternatively 90 g/10 min. Excellent flow properties as indicated by a high MFR allow for high throughput manufacturing of molded polymeric components. In an embodiment, the PPHC is a reactor grade resin without modification, which may also be termed a low order PP. In some embodiments, the PPHC is a controlled rheology grade resin, wherein the melt flow rate has been adjusted by various techniques such as visbreaking. For example, MFR may be increased by visbreaking as described in U.S. Pat. No. 6,503,990, which is incorporated by reference in its entirety. As described in that publication, quantities of peroxide are mixed with polymer resin in flake, powder, or pellet form to increase the MFR of the resin. MFR as defined herein refers to the quantity of a melted polymer resin that will flow through an orifice at a specified temperature and under a specified load. The MFR may be determined using a dead-weight piston Plastometer that extrudes polypropylene through an orifice of specified dimensions at a temperature of 230° C. and a load of 2.16 kg in accordance with ASTM D1238.

Representative examples of suitable PPHCs include without limitation 4920W and 4920WZ, which are impact copolymer resins commercially available from Total Petrochemicals USA Inc. In an embodiment, the PPHC (e.g., 4920W) has generally the physical properties set forth in Table 3.

TABLE 3

| Properties | Typical Value | ASTM Method |
|---|---|---|
| Physical (resin) | | |
| Melt Flow, g/10 min. | 100 | D1238 |
| Density, g/cc | 0.905 | D1505 |
| Melting Point, °C. | 160-165 | DSC |
| Mechanical | | |
| Tensile strength at Yield, psi (MPa) | 3700 (25) | D638 |
| Elongation at Yield, % | 6 | D638 |
| Flexural Modulus, psi (MPa) | 190,000 (1,300) | D790 |
| Notched, ft.lb./in. (J/m) | 1.0 (50) | ASTM D256A |
| Thermal | | |
| Heat Deflection, °C. | 90 | D648 |

In an embodiment, the polyolefin is polyethylene, alternatively high density polyethylene, alternatively low density polyethylene, alternatively linear low density polyethylene.

In an embodiment, the polyethylene is present in the component in an amount of from 1 wt. % to 99 wt. % by total weight of the multi-component article, alternatively from 5 wt. % to 70 wt. %, alternatively from 10 wt. % to 50 wt. %.

In an embodiment, the polyolefin comprises high density polyethylene (HDPE). Herein an HDPE has a density of equal to or greater than 0.941 g/cc, alternatively from 0.941 g/cc to 0.965 g/cc, alternatively from 0.945 g/cc to 0.960 g/cc. The HDPE may be a homopolymer or a copolymer, for example a copolymer of ethylene with one or more alpha-olefin monomers such as propylene, butene, hexene, etc. In an embodiment, the HDPE is a homopolymer. An HDPE suitable for use in this disclosure may generally have a melt-mass flow rate, determined by ASTM D1238, of from 0.01 g/10 min. to 50 g/10 min., or from 0.5 g/10 min. to 20 g/10 min., or from 1.0 g/10 min. to 10 g/10 min. In an embodiment, an HDPE suitable for use in this disclosure may generally have a tensile modulus, determined by ASTM D638, of from 100,000 psi to 350,000 psi, or from 150,000 psi to 300,000 psi, or from 180,000 psi to 220,000 psi. In an embodiment, an HDPE suitable for use in this disclosure may generally have a flexural modulus, determined by ASTM D790, of from 30,000 psi to 350,000 psi, or from 100,000 psi to 300,000 psi, or from 150,000 psi to 200,000 psi. In an embodiment, an HDPE suitable for use in this disclosure may generally have a melting temperature, determined by differential scanning calorimetry (DSC), of from 120° C. to 140° C., or from 125° C. to 135° C., or from 130° C. to 133° C.

Examples of HDPEs suitable for use in this disclosure include without limitation 6450 HDPE which is a polyethylene resin and mPE ER 2283 POLYETHYLENE which is a metallocene high density polyethylene resin with hexene as comonomer, both are commercially available from Total Petrochemicals USA, Inc. In an embodiment, a suitable HDPE has generally the physical properties set forth in Table 4 (e.g., 6450 HDEP) or Table 5 (e.g., ER 2283).

TABLE 4

| Properties | Typical Value | ASTM Method |
|---|---|---|
| Resin[1] | | |
| Melt Flow Index 190° C./2.16 kg, g/10 min | 5.0 | D 1238 |
| Density, g/cm³ | 0.962 | D 792 |
| Melting Point, ° F. | 265 | D 3417 |
| Film[1][2] | | |
| Haze, % | | |
| Gloss, % | 85 | D 523 |
| Tensile Strength @ Break (MD), psi | 3500 | D 882 |
| Tensile Strength @ Break (TD), psi | 3800 | D 882 |
| Elongation @ Break (MD), % | 850 | D 882 |
| Elongation @ Break (TD), % | 650 | D 882 |
| Secant Modulus @ 2% Strain (MD), psi | 100,000 | D 882 |
| Secant Modulus @ 2% Strain (TD), psi | 130,000 | D 882 |
| WVTR[3] @ 100° F., g/100 in²/day | 0.5 | E 96/66 |
| Low Temp. Brittleness, ° F. | <−112 | D 746 |

[1]Data developed under laboratory conditions and are not to be used as specification, maxima or minima.
[2]The data listed were determined on 1.0 mil cast film.
[3]Water Vapor Transmission Rate.

TABLE 5

| Properties | Method | Unit | Value |
|---|---|---|---|
| Physical | | | |
| Density | ISO 1183 | g/cm³ | 0.950 |
| Melt Index (2.16 kg) | ISO 1133 | g/10 min | 2.0 |
| Melting Point | EN ISO 11357 | ° C. | 133 |
| Vicat Temperature | ISO 306 | ° C. | 130 |
| Cast Film | | | |
| Dart Impact | ISO 7765-1 | g | 36 |
| Tensile Strength at Yield MD/TD | ISO 527-3 | MPa | 23/24 |
| Tensile Strength at Break MD/TD | ISO 527-3 | MPa | 43/41 |
| Elongation at Break MD/TD | ISO 527-3 | % | 640/820 |
| Elmendorf MD/TD | ISO 6393 | N/mm | 8/130 |
| Haze | ISO 14782 | % | 10 |
| Gloss 45° | ASTM D 2457 | | 68 |

In an embodiment, the polyolefin comprises a low density polyethylene (LDPE). Herein an LDPE is defined as having a density range of from 0.910 g/cm³ to 0.940 g/cm³, alternatively from 0.917 g/cm³ to 0.935 g/cm³, and alternatively from 0.920 g/cm³ to 0.930 g/cm³. The LDPE may be further characterized by the presence of increased branching when compared to an HDPE. The LDPE may be a homopolymer or a copolymer, for example a copolymer of ethylene with one or more alpha-olefin monomers such as propylene, butene, hexene, etc. In an embodiment, the LDPE is a homopolymer. An LDPE suitable for use in this disclosure may generally have a melt-mass flow rate, determined by ASTM D1238, of from 0.1 g/10 min. to 60 g/10 min., or form 0.5 G/10 min. to 30 g/10 min., or from 1 g/10 min. to 20 g/10 min. In an embodiment, an LDPE suitable for use in this disclosure may generally have a tensile modulus, determined by ASTM D638, of from 10,000 psi to 70,000 psi, or from 15,000 psi to 65,000 psi, or from 20,000 psi to 60,000 psi. In an embodiment, an LDPE suitable for use in this disclosure may generally have a flexural modulus, determined by ASTM D790, of from 9,000 psi to 60,000 psi, or from 10,000 psi to 55,000 psi, or from 15,000 psi to 50,000 psi. In an embodiment, an LDPE suitable for use in this disclosure may generally have a melting temperature, determined by differential scanning calorimetry (DSC), of from 85° C. to 125° C., or from 90° C. to 120° C., or from 95° C. to 120° C.

A representative example of a suitable LDPE is 1020 FN 24, which is an LDPE commercially available from Total Petrochemicals USA, Inc. The LDPE (e.g., 1020 FN 24) may generally have the physical properties set forth in Table 6.

TABLE 6

|  | English | SI | Method |
|---|---|---|---|
| Nominal Resin Properties | | | |
| Density | — | 0.922 g/cm³ | ASTM D1505 |
| Melt Index, 190° C./2.16 Kg | — | 2.1 g/10 min | ASTM D1238 |
| Melting Point | 232° F. | 109° C. | ASTM D3418 |
| Vicat Softening Temperature | 209° F. | 94° C. | ASTM D1525 |
| Nominal Blown Film Properties at 40 um[1] | | | |
| Haze | 7.0% | 7.0% | ASTM D1003 |
| Tensile Strength at Yield MD/TD | 1595 psi/1523 psi | 11 MPa/10.5 MPa | ISO 527-3 |
| Tensile Strength at Break MD/TD | 4061 psi/3190 psi | 28/22 MPa | ISO 527-3 |
| Elongation at Break MD/TD | 360%/630% | 360%/630% | ISO 527-3 |
| Elmendorf MD/TD | — | 75/45 N/mm | ISO 6383-2 |
| Dart test | — | 120 g | ISO 7765-1 |
| Haze | 7% | 7% | ISO 14782 |

[1]Data are obtained using laboratory test specimens produced with the following extrusion conditions: 45 mm screw diameter, L/D = 30, die diameter = 120 mm, die gap = 1.4 mm, BUR = 2.5:1, temperature = 185° C.

In an embodiment, the polyolefin comprises a linear low density polyethylene (LLDPE). LLDPE is a substantially linear polyethylene, with significant numbers of short branches. LLDPE is commonly generated by the copolymerization of ethylene with longer chain olefins. LLDPE differs structurally from low-density polyethylene because of the absence of long chain branching. In an embodiment, the LLDPE is a copolymer, for example a copolymer of ethylene with one or more alpha-olefin monomers such as propylene, butene, hexene, etc. An LLDPE suitable for use in this disclosure may generally have a density, determined by ASTM D792, of from 0.900 g/cc to 0.920 g/cc, or from 0.905 g/cc to 0.918 g/cc, or from 0.910 g/cc to 0.918 g/cc. In an embodiment, an LLDPE suitable for use in this disclosure may generally have a melt-mass flow rate, determined by ASTM D1238, of from 0.1 g/10 min. to 50 g/min., or from 0.5 g/10 min. to 30 g/10 min., or from 1 g/10 min. to 20 g/10 min. In an embodiment, an LLDPE suitable for use in this disclosure may generally have a tensile modulus, determined by ASTM D638, of from 20,000 psi to 250,000 psi, or from 50,000 psi to 220,000 psi, or from 100,000 psi to 200,000 psi. In an embodiment, an LLDPE suitable for use in this disclosure may generally have a flexural modulus, determined by ASTM D790, of from 5,000 psi to 150,000 psi, or from 10,000 psi to 130,000 psi, or from 50,000 psi to 110,000 psi. In an embodiment, an LLDPE suitable for use in this disclosure may generally have a melting temperature, determined by differential scanning calorimetry (DSC), of from 70° C. to 140° C., or from 80° C. to 130° C., or from 90° C. to 120° C.

A representative example of a suitable LLDPE is FINATHENE LL 4010 FE 18, which is an LLDPE commercially available from Total Petrochemicals. The LLDPE (e.g., FINATHENE LL 4010 FE 18) may generally have the physical properties set forth in Table 7.

TABLE 7

|  | English | SI | Method |
|---|---|---|---|
| Nominal Resin Properties | | | |
| Density | — | 0.918 g/cm³ | ASTM D792 |
| Melt Index | — | 1.0 g/10 min | ASTM D1238 |
| Nominal Film Properties at 0.984 mil (25 um) | | | |
| Film Tensile Strength at Yield, MD | 1600 psi | 11.0 MPa | ISO 527 |

TABLE 7-continued

|  | English | SI | Method |
|---|---|---|---|
| Film Tensile Strength at Yield, TD | 1600 psi | 11.0 MPa | ISO 527 |
| Film Elongation at Break, MD | 600% | 600% | ISO 527 |
| Film Elongation at Break, TD | 750% | 750% | ISO 527 |
| Secant Modulus, MD | 23.2 ksi | 0.160 GPa | ISO 5527 |
| Secant Modulus, TD | 24.7 ksi | 0.170 GPa | ISO 5527 |
| Dart Drop Test | 0.198 lb | 90.0 g | ISO 7765-1 |
| Film Tensile Strength at Break, MD | 5800 psi | 40.0 MPa | ISO 527 |
| Film Tensile Strength at Break, TD | 4350 psi | 30.0 MPa | ISO 527 |
| Thermal Properties | | | |
| Melting Point | 252° F. | 122° C. | ISO 11357-3 |
| Optical Properties | | | |
| Haze | 10.0% | 10.0% | ASTM D 1003 |

Polyolefins suitable for use in this disclosure (e.g., polypropylene, polyethylene) may be prepared using any suitable method. For example, the polyolefin may be prepared using a Ziegler-Natta catalyst, metallocene catalyst, or combinations thereof. The polyethylene, for example, may be prepared using a chromium oxide catalyst, or any other suitable catalysts.

In an embodiment, the polyolefin is prepared using Ziegler-Natta catalysts, which are typically based on titanium and organometallic aluminum compounds, for example triethylaluminum $(C_2H_5)_3Al$. Ziegler-Natta catalysts and processes for forming such catalysts are described in U.S. Pat. Nos. 4,298,718; 4,544,717; and 4,767,735, each of which is incorporated by reference herein in its entirety.

In another embodiment, the polyolefin may be prepared using a metallocene catalyst. Metallocene catalysts may be characterized generally as coordination compounds incorporating one or more cyclopentadienyl (Cp) groups (which may be substituted or unsubstituted, each substitution being the same or different) coordinated with a transition metal through π bonding. Examples of metallocene catalysts and processes for forming such catalysts are described in U.S. Pat. Nos. 4,794,096 and 4,975,403, each of which is incorporated by reference herein in its entirety. Examples of polyolefins prepared through the use of metallocene catalysts are described in further detail in U.S. Pat. Nos. 5,158,920; 5,416,228; 5,789,502; 5,807,800; 5,968,864; 6,225,251; 6,777,366; 6,777,367; 6,579,962; 6,468,936; 6,579,962; and 6,432,860, each of which is incorporated by reference herein in its entirety.

The polyolefin may also be prepared using any other catalyst or catalyst system such as a combination of Ziegler-Natta and metallocene catalysts, for example as described in U.S. Pat. Nos. 7,056,991 and 6,653,254, each of which is incorporated by reference herein in its entirety.

The polyolefin may be formed by placing one or more olefin monomer (e.g., ethylene, propylene) alone or with other monomers in a suitable reaction vessel in the presence of a catalyst (e.g., Ziegler-Natta, metallocene, etc.) and under suitable reaction conditions for polymerization thereof. Any suitable equipment and processes for polymerizing the olefin into a polymer may be used. For example, such processes may include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, which are incorporated herein by reference in their entirety.

In an embodiment, the polyolefin is formed by a gas phase polymerization process. One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from 100 psig to 500 psig, or from 200 psig to 400 psig, or from 250 psig to 350 psig. The reactor temperature in a gas phase process may vary from 30° C. to 120° C., or from 60° C. to 115° C., or from 70° C. to 110° C., or from 70° C. to 95° C., for example as described in U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

In an embodiment, the polyolefin is formed by a slurry phase polymerization process. Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene). The medium employed is generally liquid under the conditions of polymerization and relatively inert. A bulk phase process is similar to that of a slurry process. However, a process may be a bulk process, a slurry process or a bulk slurry process.

In an embodiment, the multi-component article comprises at least one component comprising polylactic acid. Any suitable polylactic acid may be used in this disclosure. For example, polylactic acid may comprise poly-L-lactide (PLLA), poly-D-lactide (PDLA), poly-LD-lactide (PDLLA), or combinations thereof. Polylactic acid may be prepared using any suitable method. For example, polylactic acid may be prepared by dehydration condensation of lactic acid, such as described in U.S. Pat. No. 5,310,865, which is incorporated herein by reference in its entirety. Alternatively, polylactic acid may be prepared by synthesis of a cyclic lactide (also known as cyclic dimer) from lactic acid followed by ring opening polymerization of the cyclic lactide. An example of such a process is described in U.S. Pat. No. 2,758,987, which is incorporated herein by reference in its entirety.

Catalysts may be used in the production of polylactic acid. The catalysts may be of any type suitable for the process. Examples of such catalysts include without limitation tin compounds such as tin octylate, titanium compounds such as tetraisopropyl titanate, zirconium compounds such as zirconium isopropoxide, and antimony compounds such as antimony trioxide.

Additives such as those described previously may be introduced to the polylactic acid composition. Additional processes to produce polylactic acid are described in U.S. Pat. Nos. 5,821,327; 5,770,682; 5,508,378; 5,470,944; and 4,797,468, which are incorporated herein by reference in their entirety.

In an embodiment, a polylactic acid suitable for use in this disclosure may have a density of from 1.238 g/cc to 1.265 g/cc, alternatively from 1.24 g/cc to 1.26 g/cc, and alternatively from 1.245 g/cc to 1.255 g/cc as determined in accordance with ASTM D792; a melt index (210° C., 2.16 kg) of from 5 g/10 min. to 35 g/10 min. to 35 g/10 min., alternatively from 10 g/10 min. to 30 g/10 min., and alternatively from 10 g/10 min. to 20 g/10 min as determined in accordance with ASTM D1238; a crystalline melt temperature of from 150° C. to 180° C., alternatively from 160° C. to 175° C., and alternatively from 160° C. to 170° C. as determined in accordance with ASTM D3418; a glass transition temperature of from 45° C. to 85° C., alternatively from 50° C. to 80° C., and alternatively from 55° C. to 75° C. as determined in accordance with ASTM D3417; a tensile yield strength of from 4,000 psi to 25,000 psi, alternatively from 5,000 psi to 20,000 psi, and alternatively from 5,500 psi to 20,000 psi as determined in accordance with ASTM D638; a tensile elongation of from 1.5% to 10%, alternatively from 2% to 8%, and alternatively of from 3% to 7% as determined in accordance with ASTM D638; a flexural modulus of from 250,000 psi to 600,000 psi, alternatively from 300,000 psi to 550,000 psi, and alternatively from 400,000 psi to 500,000 psi as determined in accordance with ASTM D790; a notched Izod impact of from 0.1 ft-lb/in to 0.8 ft-lb/in, alternatively from 0.2 ft-lb/in to 0.7 ft-lb/in, and alternatively from 0.4 ft-lb/in to 0.6 ft-lb/in as determined in accordance with ASTM D256.

An example of a polylactic acid suitable for use in this disclosure includes without limitation NatureWorks 3051D, which is commercially available from Nature Works LLC. In an embodiment, polylactic acid suitable for use in this disclosure (e.g., NatureWorks 3051D) may generally have the physical properties set forth in Table 8.

TABLE 8

| Properties | 3051D Typical Value | Test Method |
|---|---|---|
| Physical | | |
| Density, g/cc | 1.25 | ASTM D792 |
| Melt Index (210° C., 2.16 kg), g/10 min. | 10-25 | ASTM D1238 |
| Crystalline Melt Temperature, ° C. | 150-165 | ASTM D3418 |
| Glass Transition Temperature, ° C. | 55-65 | ASTM D3417 |
| Mechanical | | |
| Tensile yield strength, psi | 7000 | ASTM D638 |
| Tensile elongation, % | 2.5 | ASTM D638 |
| Flexural Modulus, psi | 555,000 | ASTM D790 |
| Notched Izod impact, ft-lb/in | 0.3 | ASTM D256 |

In an embodiment, polylactic acid is present in the component in an amount of from 1 wt. % to 99 wt. % by total weight of the multi-component article, alternatively from 5 wt. % to 70 wt. %, alternatively from 10 wt. % to 50 wt. %.

In an embodiment, the multi-component articles comprise at least one component comprising a reactive modifier. Herein, reactive modifiers refer to polymeric additives that when added to a molten polyolefin and PLA (e.g., PP/PLA blend or PE/PLA blend) form compounds in situ that serve to stabilize the interface between the polyolefin and PLA. The compounds formed in situ act as compatibilizers and the reactive modifiers are precursors to these compatibilizers.

In an embodiment, the reactive modifier comprises an epoxy-functionalized polyolefin. Examples of epoxy-functionalized polyolefins suitable for use in this disclosure include without limitation epoxy-functionalized polypropylene such as glycidyl methacrylate grafted polypropylene (PP-g-GMA), epoxy-functionalized polyethylene such as polyethylene co glycidyl methacrylate (PE-co-GMA), or combinations thereof. An example of an epoxy-functionalized polyethylene suitable for use in this disclosure includes LOTADER AX8840, which is a PE-co-GMA containing 8% GMA that is commercially available from Arkema.

In another embodiment, the reactive modifier comprises PP-g-GMA. PP-g-GMA may be prepared by any suitable method such as for example by grafting GMA onto polypropylene in the presence of an initiator such as peroxide. Examples of initiators suitable for use in this disclosure include without limitation LUPERSOL 101 and TRIGANOX 301, which are peroxides commercially available from Arkema. In an embodiment, the initiator may be used in an amount of from 0.03% to 2 wt. % by total weight of the biodegradable polymeric compositions, alternatively from 0.2 wt. % to 0.8 wt. %, alternatively from 0.3 wt. % to 0.5 wt. %.

The grafting reaction of GMA onto PP may be conducted in a molten state inside an extruder such as for example a single extruder or a twin-screw extruder. Hereinafter, such process is referred to as reactive extrusion. A feedstock comprising PP, GMA, and initiator (i.e., peroxide) may be fed into an extruder reactor sequentially along the extruder, alternatively the feedstock (i.e., PP, GMA, and initiator) may be pre-mixed outside and fed into the extruder.

In an alternative embodiment, the PP-g-GMA is prepared by grafting GMA onto polypropylene in the presence of an initiator and a multi-functional acrylate comonomer. The multi-functional acrylate comonomer may comprise polyethylene glycol diacrylate, trimethylolpropane triacrylate (TMPTA), or combinations thereof.

The multi-functional acrylate comonomer may be further characterized by a high flash point. The flash point of a material is the lowest temperature at which it can form an ignitable mixture in air, as determined in accordance with ASTM D93. The higher the flash point, the less flammable the material, which is a beneficial attribute for melt reactive extrusion. In an embodiment, the multi-functional acrylate comonomer may have a flash point of from 50° C. to 120° C., alternatively of from 70° C. to 100° C., alternatively of from 80° C. to 100° C. Examples of multi-functional acrylate comonomers suitable for use in this disclosure include without limitation SR259 (polyethylene glycol diacrylate), CD560 (alkoxylated hexanediol diacrylate), and SR351 (TMPTA), which are commercially available from Sartomer.

The grafting reaction of GMA onto polypropylene in the presence of a peroxide and the multi-functional acrylate comonomer polyethylene glycol diacrylate is depicted in Scheme 1.

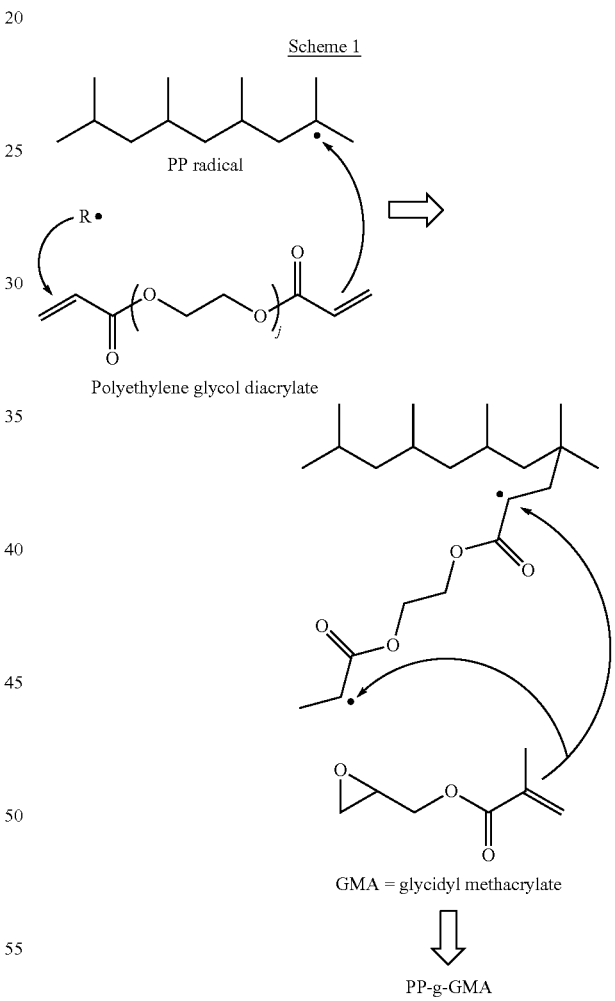

Without wishing to be limited by theory, the hydrogens on the tertiary carbon of polypropylene molecules can be easily abstracted in the presence of peroxide during reactive extrusion, forming polypropylene macroradicals with unpaired electrons. The polypropylene macroradicals, which are generally unstable, tend to form free radicals through a step referred to as "β-scission." β-scission refers to a family of reactions wherein bonds that are in beta-position to a radical are cleaved resulting in the formation of a double bond and a new radical. The β-scission reaction is believed to be responsible mainly for the formation of internal double bonds thus its occurrence is correlated with the allylic content of the final polymer. β-scission is typically favored over the grafting reaction (i.e., the addition of the GMA) resulting in both a lower grafting of GMA and a polypropylene having a lower average molecular weight. However, in the reactions comprising a multi-functional acrylate comonomer, the multi-functional acrylate comonomer may function to readily capture the polypropylene micro-radicals resulting in the formation of a more stable intermediate (i.e., polypropylene-acrylate radicals). The relatively stable propylene-acrylate radicals tend to react more readily with GMA, which is an acrylate type monomer, and consequently favor the grafting reaction.

Furthermore, as shown in Scheme 1, multiple free radicals may exist on the grafted propylene-acrylate molecules thus making it easier to capture and initiate the reaction of GMA. The reactivity of GMA towards acrylate free radicals may be higher than towards polypropylene tertiary macro-radicals. Consequently, PP-g-GMA prepared using a reaction mixture comprising a multi-functional acrylate comonomer may display a higher degree of grafting than a PP-g-GMA prepared using an otherwise similar composition in the absence of a multi-functional acrylate comonomer. PP-g-GMA prepared using a multifunctional acrylate comonomer is hereinafter referred to as a highly grafted GMA (HGGMA).

In an embodiment, the HGGMA which is a reactive modifier, is prepared from a reaction mixture comprising polypropylene present in an amount of from 80 wt. % to 99.5 wt. %, alternatively from 90 wt. % to 99 wt. %, and alternatively from 95 wt. % to 99 wt. %; GMA present in an amount of from 0.5 wt. % to 20 wt. %, alternatively from 1.0 wt. % to 10 wt. %, and alternatively from 1.0 wt. % to 5.0 wt. %; a multi-functional acrylate comonomer (e.g., SE259) present in an amount of from 0.5 wt. % to 15 wt. %, alternatively from 1.0 wt. % to 10 wt. %, and alternatively from 1.0 wt. % to 5.0 wt. %; and an initiator (e.g. LUPERSOL 101) present in an amount of from 0.05 wt. % to 1.5 wt. %, alternatively from 0.2 wt. % to 0.8 wt. %, and alternatively from 0.3 wt. % to 0.5 wt. %. The ratio of GMA: multi-functional acrylate comonomer in the HGGMA may range from 1:5 to 10:1, alternatively from 1:2 to 5:1, and alternatively from 1:1 to 3:1.

The amount of grafting of GMA onto the polyolefin may vary depending on a variety of factors such as the type of materials used and processing conditions. Such parameters may be varied by one of ordinary skill in the art with the benefits of this disclosure to produce reactive modifiers having a user-desired grafting yield.

The grafting yield may be determined using any suitable method. For example, the grafting yield may be determined by Fourier Transform Infrared Spectroscopy (FTIR) spectroscopy. In an embodiment, a method for determining the grafting yield comprises obtaining the FTIR spectra of polymeric samples having a mixture of PP and GMA wherein the amount of each component is known. A calibration curve may be generated by plotting the signal intensity at one or more wavelengths as a function of component concentration. The FTIR spectra of a PP-g-GMA sample may then be determined and compared to the calibration curve in order to determine the grafting yield. This method is described in more detail in Angew. Makromol. Chem, 1995, V229 pages 1-13. In an embodiment, a HGGMA may have a grafting yield of from 0.2 wt. % to 15 wt. %, alternatively from 0.5 wt. % to 10 wt. %, alternatively from 1.0 wt. % to 5.0 wt. %.

In an embodiment, the reactive modifier is present in the component in an amount of from 0.5 wt. % to 15 wt. % based on total weight of the multi-component article, alternatively from 1.0 wt. % to 10 wt. %, alternatively from 3.0 wt. % to 5.0 wt. %.

In an embodiment, at least one component of the multi-component article comprises a compatibilized blend of the PLA and polyolefin. The blend may be compatibilized by reactive extrusion compounding of the PLA, polyolefin, and reactive modifier all of the types described herein.

In an embodiment, the PP, PE, PLA, and/or blends thereof may also contain additives to impart desired physical properties, such as printability, increased gloss, or a reduced blocking tendency. Examples of additives include without limitation stabilizers, ultra-violet screening agents, oxidants, anti-oxidants, anti-static agents, ultraviolet light absorbents, fire retardants, processing oils, mold release agents, coloring agents, pigments/dyes, fillers, and/or other suitable additives. The aforementioned additives may be used either singularly or in combination to form various formulations of the polymer. For example, stabilizers or stabilization agents may be employed to help protect the polymer resin from degradation due to exposure to excessive temperatures and/or ultraviolet light. These additives may be included in amounts effective to impart the desired properties.

In an embodiment, the PLA component of a multi-component article prepared from the compositions of this disclosure may be colored. In such embodiments, coloring agents such as dyes or pigments may be added to PLA. This will be described in more detail later herein. Effective additive amounts and processes for inclusion of these additives to polymeric compositions may be determined by one skilled in the art with the aid of this disclosure.

In an embodiment, the multi-component article may comprise one component comprising PLA, and a second component comprising a polyolefin and a reactive modifier. In another embodiment, the multi-component article comprises one component comprising a blend of PLA and a polyolefin and a second component comprising a polyolefin and a reactive modifier. In an embodiment, the multi-component article may comprise at least one component comprising a polyolefin (e.g., PP or PE), at least one component comprising a PLA, and at least one component comprising a polyolefin (e.g., PP or PE) and a reactive modifier, all of the type previously described herein. Herein, a component comprising a polyolefin and a reactive modifier is referred to as PORM such as PP/PP-g-GMA, PE/PE-co-GMA, etc.

In an embodiment, a multi-component article may comprise at least one component comprising PP, at least one component comprising PLA, and at least one component comprising PP/PP-g-GMA, all of the type previously described herein. In another embodiment, a multi-component article may comprise at least one component comprising PE, at least one component comprising PLA, and at least one component comprising PE/PE-co-GMA, all of the type previously described herein.

Without wishing to be limited by theory, the reactive modifier may function to chemically interlink the components comprising polyolefin and the components comprising PLA and/or adhere said components.

In an embodiment, the multi-component article is a multi-component fiber. The multi-component fiber may comprise at least one component comprising a polyolefin (e.g., PP, PE), at least one component comprising a PLA, and at least one component comprising a PORM, all of the type previously described herein. In an embodiment, the multi-component fiber is a bicomponent fiber having a first component comprising PLA and a second component comprising a PORM (e.g., PP/PP-g-GMA, PE/PE-co-GMA).

The bicomponent fiber may be produced using any method suitable for the production of such a fiber. For example, the bicomponent fiber may be produced by coextrusion of at least one component comprising PLA and at least one component comprising a PORM. In an embodiment, the components of the bicomponent fiber are melted, fed to a spinneret orifice, and coextruded into fibers. In an embodiment, the components of the fibers when extruded adhere to each other in the absence of materials or treatments that promote adhesion.

The fibers thus formed may be cooled for example in air in a quench column and then passed through a spin finisher, guide, and collected. The collected fibers may be further processed for example, they may be drawn to produce drawn fibers. The fibers or drawn fibers may be formed into various end-use articles.

In an embodiment, the bicomponent fiber may be formed into a variety of configurations for example as illustrated in FIG. 1. Referring to FIG. 1, the bicomponent fiber may be configured in a sheath-core 110, or a side-by-side 120 configuration. The sheath-core 110 configuration comprises a sheath 110A outer layer, and a core 110B inner layer. The sheath-core 110 configuration may be concentric 112 wherein the core's center of mass 112B coincides with the center of mass of the sheath 112A or eccentric 114 wherein the core's center of mass 114B differs from the center of mass 114A of the sheath. A side view 116 of the sheath core configuration is also shown in FIG. 1. In an embodiment, the core layer of a bicomponent fiber comprises PLA, alternatively the sheath layer of the bicomponent fiber comprises PLA.

The side by side 120 configuration may comprise a PLA side 120A and a PORM side 120B. The front view 122 and the side view 124 of the side by side configuration are also shown in FIG. 1.

The bicomponent fiber may have a total linear mass density of all the components of from 1 to 20 denier per filament (dpf), alternatively from 1 to 15 dpf, alternatively from 2 to 10 dpf. The linear mass density of the individual components (e.g., PLA, polyolefin, or PORM) may be selected by one of ordinary skill in the art with the aid of this disclosure to achieve one or more user desired properties (i.e., physical properties, mechanical properties, etc.). For example the bicomponent fiber may be prepared in a core sheath configuration wherein the sheath layer comprises PLA and the core layer comprises a PP/PP-g-GMA. In such an embodiment, the core layer may have a linear mass density of from 50% to 95% of the total linear mass density of the bicomponent fiber, alternatively from 60% to 90%, alternatively from 70% to 90%.

In an embodiment, the multi-component article is a multi-layer film. The multi-layer film may comprise at least one layer comprising PLA, at least one layer comprising a polyolefin (e.g., PP, PE), and at least one layer comprising a PORM. Herein, the reactive modifier may also function to chemically interlink the polyolefin component and PLA component and improve cohesion. In an embodiment, the multi-layer film of the type described herein may have an increased strength of adhesion between the polyolefin and PLA when compared to a similar multi-layer film lacking the PORM. The strength of adhesion between the polyolefin and PLA may be determined by measuring the strength required to peel off the polyolefin from PLA, as determined in accordance with ASTM D3330/3330M-00. In an embodiment, the multi-layer film of the type described herein may have a peel strength between the polyolefin and PLA of equal to or greater than 0.01 pounds forced per inch width (lb f/1 in width), alternatively equal to or greater than 0.1 lb f/1 in width, alternatively equal to or greater than 0.5 lb f/1 in width, alternatively equal to or greater than 1 lb f/1 in width, alternatively equal to or greater than 2 lb f/1 in width.

In addition, the PORM layer comprising the reactive modifier may act as an adhesive or tie layer that serves to improve the interfacial bonding between PP and PLA or PE and PLA, resulting in a multi-layer film having improved bonding when compared to an otherwise similar multi-layer film lacking the reactive modifier. Without wishing to be limited by theory, the reactive modifier may migrate to the interface of the blend (e.g., PP and PLA) and serve as a tie layer.

The polyolefin and the reactive modifier may be contacted prior to coextrusion to form a PORM mixture. In an embodiment, the PORM is polypropylene and PP-g-GMA, alternatively the PORM is polyethylene and PE-co-GMA. In an embodiment, PLA, polyolefin, and the PORM are coextruded through a slot or die with two or more orifices arranged such that the extruded sheets merge and form a composite extruded sheet (i.e., the multi-layer film) wherein the layers of the film are adhered to each other. The composite extruded sheet may have one or more PLA layers, one or more polyolefin layers, and one or more PORM layers. In an embodiment, the PLA, polyolefin (e.g., PP, PE), and the PORM layers directly adhere to each other in the multi-layer film in the absence of materials or treatments that promote adhesion. Such materials and treatments have been previously described herein.

In an embodiment, the multi-layered film is oriented. Generally, orientation of a polymer composition refers to the process whereby directionality (the orientation of molecules relative to each other) is imposed upon the polymeric configurations in the film. Such orientation is employed to impart desirable properties to films, such as toughness and opaqueness, for example. As used herein, the term "biaxial orientation" refers to a process in which a polymeric composition is heated to a temperature at or above its glass-transition temperature but below its crystalline melting point. Immediately following heating, the material may then be extruded into a film, and stretched in both a longitudinal direction (i.e., the machine direction) and in a transverse or lateral direction (i.e., the tenter direction).

In an embodiment, a biodegradable polymeric composition of the type described herein is heated in an extruder. The molten polymer may then exit through a die and the molten plaque may be used to form an extruded film, a cast film, a biaxially oriented film, or the like. In an embodiment, the molten plaque may exit through the die and be taken up onto a roller without additional stretching to form an extruded film. Alternatively, the molten plaque may exit through the die and be uniaxially stretched while being taken up onto a chill roller where it is cooled to produce a cast film.

In an embodiment, the molten plaque exits through the die and is passed over a first roller (e.g., a chill roller) which solidifies the polymeric composition into a multi-layered film. Then, the multi-layered film may be oriented by stretching such film in a longitudinal direction and in a transverse direction. The longitudinal orientation is generally accomplished through the use of two sequentially disposed rollers, the second (or fast roller) operating at a speed in relation to the slower roller corresponding to the desired orientation ratio. Longitudinal orientation may alternatively be accomplished through a series of rollers with increasing speeds, sometimes with additional intermediate rollers for temperature control and other functions.

After longitudinal orientation, the multi-layered film may be cooled, pre-heated, and passed into a lateral orientation section. The lateral orientation section may include, for example, a tenter frame mechanism, where the multi-layered film is stressed in the transverse direction. Annealing and/or additional processing may follow such orientation. Alternatively, the multi-layered film may be stretched in both directions at same time.

Without wishing to be limited by theory, on cooling, the molecular alignment imposed by stretching competes favorably with crystallization, and the drawn polymer molecules condense into a crystalline network with crystalline domains aligned in the direction of the stretching force. Additional disclosure on biaxial film production may be found in U.S. Pat. Nos. 4,029,876 and 2,178,104, each of which is incorporated by reference herein in its entirety.

Figure 2:
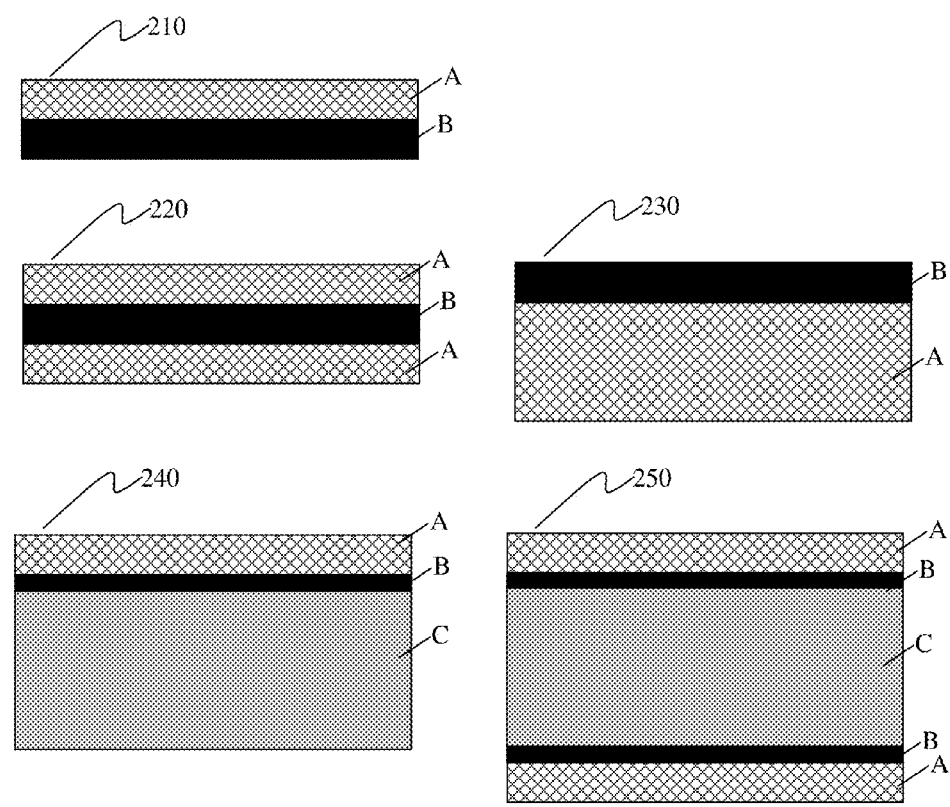
FIG. 2 is an illustration of embodiments of multi-layered films.

Various embodiments of multi-layer films are illustrated in FIG. 2. Referring to FIG. 2, in the depicted configurations, the PLA layers are labeled A, the PORM layers are labeled B, and the polyolefin layers are labeled C. The multi-layer film may be configured for example wherein a PORM layer may be a bottom layer as shown in 210, a core layer as shown in 220, or a cap layer as shown in 230. In other embodiments, the PORM may function as a tie layer wherein the PORM promotes adhesion between layers in which it is disposed. For example, the PORM may serve as a tie layer in a 3-layer film 240 where it may be disposed between a PLA layer A and a polyolefin layer C. In another embodiment, the PORM may serve as a tie layer in a 5-layer film 250 where a first PORM may be disposed between a first PLA layer A and a polyolefin layer C and a second PORM may be disposed between a polyolefin layer C and a second PLA layer A.

The multi-layer film may have a total thickness (sum thickness of all the layers) of from 0.5 to 150 mils, alternatively from 1 to 50 mils, alternatively from 2 to 20 mils. The thickness of the individual layers (PLA, PORM, or polyolefin) may be selected by one of ordinary skill in the art with the aid of this disclosure to achieve user desired properties (i.e., physical properties, mechanical properties, etc.). For example, a multi-layer film of the configuration shown in FIG. 2, 240, may have a polyolefin layer with a thickness of from 3% to 45% of the total thickness of the multi-layered film, alternatively from 5% to 20%, alternatively from 5% to 10%; a PORM as the tie layer with a thickness of from 0.2% to 30%, alternatively from 1.0% to 15%, and alternatively from 5% to 10%; and a PLA layer with a thickness of from 1% to 50%, alternatively from 5% to 40%, and alternatively from 10% to 30%.

The multi-component articles of this disclosure may be converted to end-use articles by any suitable method. In an embodiment, this conversion is a plastics shaping process such as blowmoulding, extrusion, injection blowmoulding, injection stretch blowmoulding, thermoforming, and the like. Examples of end use articles into which the biodegradable polymeric composition of the type described herein may be formed include food packaging, office supplies, plastic lumber, replacement lumber, patio decking, structural supports, laminate flooring compositions, polymeric foam substrate; decorative surfaces (i.e., crown molding, etc.), weatherable outdoor materials, point-of-purchase signs and displays, housewares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., LEGO bricks), musical instruments, golf club heads, piping, business machines and telephone components, shower heads, door handles, faucet handles, wheel covers, automotive front grilles, and so forth.

In an embodiment, multi-component articles of this disclosure are fibers (e.g., multi-component fibers, bicomponent fibers, etc.) for use in woven fibers such as fabrics that may be further processed to form textile for example by weaving, knitting, crocheting, knotting, fiber pressing, or combinations thereof. In another embodiment, these fibers may be employed in concentrate reinforcement and woven fibers such as yarns and fabrics for use as binding fibers in multi-fiber woven fabrics. Such multi-fiber woven fabrics may be used in carpet manufacturing.

In an embodiment, multi-component article is a multi-layered film wherein the layer comprising the reactive modifier may function as a core layer, a tie layer, a cap layer, or combinations thereof. Additional end use articles would be apparent to those skilled in the art with the benefits of this disclosure.

The multi-component articles disclosed herein may display an improved interfacial adhesion between the components (e.g., PLA and polyolefin) when compared to an otherwise similar article lacking a component comprising a reactive modifier. Herein interfacial adhesion refers to an adhesion in which the interfaces between the components are maintained by intermolecular forces, chain entanglements, or both that span the interfaces of the components.

The multi-component articles disclosed herein may display an improved resilience when compared to an otherwise similar article lacking a component comprising PLA. Herein resilience refers to the ability of a material to absorb energy when deformed elastically and to return it when unloaded. PLA has a higher resilience than PE or PP, thus the biodegradable polymeric compositions of the type described herein may display an increased resilience when compared to an otherwise similar composition lacking PLA. For example, a carpet prepared from bi-component fibers of the type described herein may resist matting or crushing when a force is applied. As another example, a fabric prepared from bi-component fibers of the type described herein may display an improved resistance to wrinkling.

The multi-component articles disclosed herein may display an improved rigidity when compared to an otherwise similar article lacking a PLA component. PLA has a higher rigidity than PE or PP, thus the multi-component article may display an increased rigidity when compared to an otherwise similar article lacking a PLA component. Herein rigidity refers to the resistance of a material to a change of shape. For example, in a multi-layer film prepared as described herein, the PLA component may be an outer layer (e.g., a cap layer) which displays an increased resistance to surface abrasions such as scratches, indentations, chips and the like.

The multi-component articles disclosed herein may display an improved dyeability when compared to an otherwise similar article lacking a PLA component. The polar nature of PLA may afford an increased compatibility with dyes and/or coloring agents which are also typically polar. For example, a bi-component fiber may be configured in a core-sheath arrangement of the type described previously herein where the sheath may comprise PLA. Alternatively, a multi-layer film may be configured such that the outer layers comprise PLA. In either embodiment, the PLA may be able to absorb a coloring agent or dye more readily than an otherwise similar article lacking a PLA component.

The multi-component articles disclosed herein may display an improved printability when compared to an otherwise similar article lacking a PLA component. Without wishing to be limited by theory, the polar nature of PLA may afford improved printability and/or an improved surface treatment for printing. In an embodiment, co-extruded sheets and films of polyolefins with PLA as cap layers may have surface printability or surface treatment characteristics similar to that observed with neat PLA films and/or sheets.

The multi-component articles disclosed herein may display an improved scratch resistance when compared to an otherwise similar article lacking a PLA component. PLA has a much higher stiffness and better scratch resistance than polyolefins. For example, co-extruded sheets and films of polyolefins with PLA as cap layers may have surface scratch resistance similar to neat PLA films and sheets.

The 3276 fluff was mixed with the multi-functional acrylate comonomer (i.e., GMA) and the initiator in a 50 liter mixer in the amounts of 30 lbs. Next, the mixed fluff was fed into a MICRO-27 twin-screw extruder at a screw speed of 100 rpm with vacuum devolatilization enabled and a throughput of 10 lbs/hr. The zone profiles were 400° F. –400° F. –395° F. –390° F. –380° F. –375° F. –370° F. –365° F. –360° F. –360° F. –360° F. –360° F. The experimental processing parameters are summarized in Table 9.

TABLE 9

| | Formulations | | | Extrusion parameters | | | Melt | Products | |
|---|---|---|---|---|---|---|---|---|---|
| Sample # | Base Resin | GMA (phr) | Co-mo (phr) | L-101 (phr) | Output (lbs/hr) | Screw (rpm) | Torque (%) | temp/Pressure (F/psi) | MFR (g/10 min.) | GMA (%) |
| #1 (PP) | 3276 fluff | 0 | | 0.05 | 10 | 100 | 33 | 385.6/310 | 15.6 | 0 |
| #2 (PP-g-GMA-3) | 3276 fluff | 3 | | 0.30 | 10 | 100 | 32 | 389.0/250 | 25.5 | ~0.2% |
| #3 (PP-g-GMA-6) | 3276 fluff | 3 | 1(SR259) | 0.30 | 10 | 100 | 29 | 386/200 | 36.2 | ~3.0% |
| #4 (PP-g-GMA-7) | 3276 fluff | 1.7 | 1(SR351) | 0.30 | 10 | 100 | — | —/— | 25.6 | ~2.0% |

The multi-component articles disclosed herein may display an improved impact resistance when compared to an otherwise similar article lacking a PLA component. Without wishing to be limited by theory, polyolefin sheets and films are tougher than PLA sheets and films. Thus, co-extruded sheets and films of polyolefins with PLA may have an increased impact resistance when compared to similar films and sheets prepared from the PLA homopolymer.

EXAMPLES

The disclosure having been generally described, the following examples are given as particular embodiments of the disclosure and to demonstrate the practice and advantages thereof. It is understood that the examples are given by way of illustration and are not intended to limit the specification or the claims to follow in any manner. Hereinafter, unless otherwise indicated, the amount of components in a composition or formulation is presented as percentages which denote the weight percent of the component based on the total weight of the composition.

Example 1

The degree of GMA grafting onto polypropylene during the preparation of a reactive modifier (i.e., PP-g-GMA) was investigated. The samples were prepared from using a base polypropylene resin, 3276 and GMA with a flash point of 85° C. and viscosity of 2.7 cps. The base resin, 3276, is a polypropylene homopolymer commercially available from Total Petrochemicals while GMA was commercially available from Dow Chemicals The multi-functional acrylate comonomers were SR259 polyethylene glycol (200) diacrylate with a viscosity of 25 cps and SR351 trimethylolpropane triacrylate (TMTPA) esters with a viscosity of 106 cps; both of which are commercially available from Sartomer. The initiator used was peroxide LUPERSOL 101 (L101). Formulations are set forth in Table 3 as weight parts per hundred parts of the base resin (phr).

Figure 3:
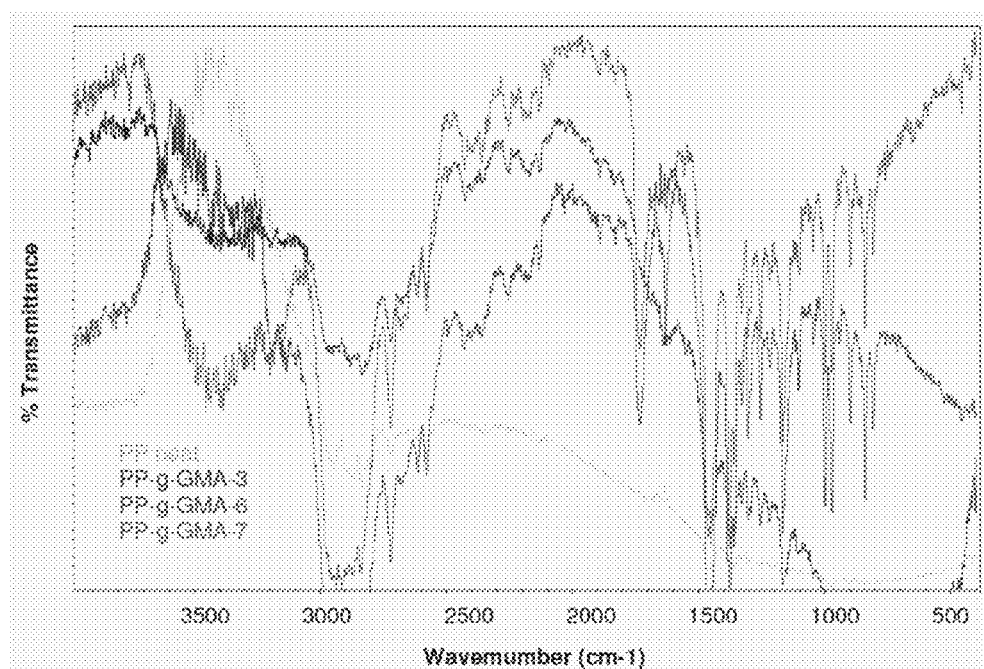
FIGS. 3 and 4 are Fourier Transform Infrared Spectroscopy (FTIR) spectra for the samples from Example 1.

The grafting yield was then measured based on Fourier Transform Infrared Spectroscopy (FTIR) spectra of the resulting PP-g-GMA products. The PP-g-GMA products were dissolved in hot xylene and precipitated in an excess amount of acetone. The GMA oligomers are soluble in acetone. The precipitated PP-g-GMA was then dried under vacuum, and compressed with KBr into disks for FTIR analysis. FIG. 3 is the FTIR spectra of the various PP-g-GMA samples. Referring to FIG. 3, the presence of polypropylene can be detected by the appearance of a peak at 2722 cm-1 for all samples. Sample 1 is the re-extrusion of the base resin with 0.05 phr of peroxide. Sample 2 is a GMA-grafted PP, which was prepared using conventional reactive extrusion formulations (i.e., in the absence of a multi-functional acrylate comonomer), exhibited negligible C=O peak intensity at 1730 cm-1, the peak assigned to the grafted GMA, indicating that minimal GMA grafting yield was obtained. However, when a multi-functional acrylate comonomer was present (Samples 3 and 4), a strong C=O peak was observed.

Figure 4:
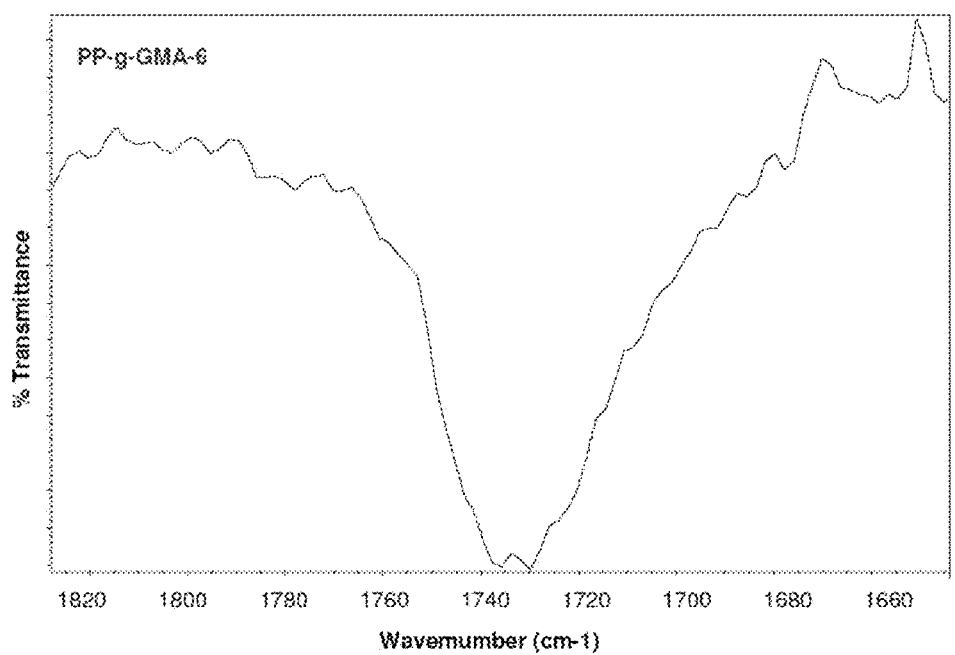

Closer examination of the C=O peak at 1730 $cm^{-1}$ for Samples 3 4, shown in FIG. 4, suggests the signal is actually two overlapping peaks indicating that both the GMA and the multi-functional acrylate comonomer were grafted onto the polypropylene backbone. The weak epoxy peak at approximately 860 $cm^{-1}$, which was assigned to GMA molecules grafted onto polypropylene main chains, is also visible in the FTIR spectra.

The grafting yield (GMA %) was then calculated based on the FTIR results and are also tabulated in Table 9. With GMA as a neat monomer (without a multi-functional acrylate comononer), the grafting yield observed in Sample 2 was negligible. However, at a ratio of 3:1 GMA: multi-functional acrylate comonomer, the grafting yield increased as shown in Samples 3 and 4. PP-g-GMA prepared as described in this example may be combined with other components as described herein (e.g., PP and PLA) to form biodegradable polymeric compositions. Without wishing to be limited by theory, high grafting PP-g-GMA can be more effective in compatibilizing polyolefin and PLA in the biodegradable polymeric compositions.

Example 2

The peel strength of multi-layer films (e.g., two-layered films) comprising a polyolefin, a reactive modifier, and a degradable polymer was investigated. Four two-layered films samples, designated Samples 5-8, were prepared to form 2 mils thick films with a PP layer of 1.5 mils and a PLA layer of 0.5 mils thickness. Sample 5, which was a control sample, was prepared from PP3371 (3371), which is a polypropylene homopolymer commercially available from Total Petrochemicals USA, Inc and coextruded with PLA 6201D (PLA) which is a polylactic acid commercially available from Nature Works LLC. Sample 6 was prepared from a blend of 3371 with 3% PP-g-GMA (wherein the PP-g-GMA has 2.5% GMA) and coextruded with PLA. Sample 7 was prepared from a blend of 3371 with 3% LOTADER AX8900 (a reactive modifier commercially available from Arkema) and coextruded with PLA. Sample 7, which was a comparative sample, was prepared from a blend of 3371 with 3% POLYBOND 3200 which is a cavitating booster having 2.7% maleic anhydride commercially available from Chemtura and coextruded with PLA. Samples 5-8 appeared to be clear and transparent after extrusion. Next, the peel strength of each sample was determined in accordance with ASTM D3330/3330 M-00. The components of each sample and the results of peel strength test are tabulated in Table 10.

TABLE 10

| | Coextruded Film (2 mil) | | Peel Strength |
|---|---|---|---|
| Sample | PP (1.5 mils) | PLA (0.5 mils) | (lb f/1 in width) |
| 5 | 3371 | PLA 6201D | 0 |
| 6 | 3371 + 3% PP-g-GMA | PLA 6201D | 0 |
| 7 | 3371 + 3% LOTADER | PLA 6201D | 0 |
| 8 | 3371 + 3% POLYBOND | PLA 6201D | 0 |

The results demonstrate that for all formulations tested, the resultant films were peeled off easily indicating that the adhesion between the layers of the films was weak. Without wishing to be limited by theory, for films prepared from samples comprising only 3% reactive modifier (e.g., LOTADER AX8900 or PP-g-GMA) the reactive modifier concentration at the interface between PP and PLA layers may be insufficient. For films prepared from samples comprising such a reactive modifier, the reactive modifier present in the PP bulk may have had insufficient time to migrate into the interface between PP and PLA. The PP and PLA in the absence of the reactive modifier may have lacked sufficient chemical bonding during co-extrusion resulting the film layers displaying poor adhesion.

Example 3

The peel strength of multi-layer films comprising a polyolefin, a reactive modifier, and a degradable polymer was investigated. A control sample, designated Sample 9, was prepared from 3371 which was coextruded with PLA to form 2 mil thick films having 1.2 mils of PP and 0.5 mils of PLA.

Three samples, designated Samples 10-12, were prepared using a PP layer of 1.2 mils, a tie layer of 0.3 mils, and a PLA layer of 0.5 mils thickness. Sample 10 was prepared from 3371 coextruded with PLA and a tie layer of PP-g-GMA. Sample 11 was prepared from 3371 coextruded with PLA and a tie layer of LOTADER AX8900. Sample 12, which was a comparative sample, was prepared from a 3371 coextruded with PLA and a tie layer of POLYBOND 3200. Next, the peel strength of each sample was determined as described in Example 2. The components of each sample and the results of peel strength test are tabulated in Table 11.

TABLE 11

| | Coextruded Film (2 mil) | | | |
|---|---|---|---|---|
| Sample | PP (1.2 mils) | Tie Layer (0.3 mils) | PLA (0.5 mils) | Peel Strength (lbf/inch width) |
| 9 | 3371 | n/a | PLA 6201D | 0 |
| 10 | 3371 | PP-g-GMA | PLA 6201D | ~0.3 |
| 11 | 3371 | LOTADER | PLA 6201D | Too strong for peel test |
| 12 | 3371 | POLYBOND | PLA 6201D | 0 |

The results demonstrate that the film without any tie layer (Sample 9) and the film with POLYBOND as a tie layer (Sample 12) were peeled off easily. Sample 10 with a PP-g-GMA tie layer displayed increased adhesion between the layers with a peel strength of about 0.3 lbf per inch width. Sample 11 with a LOTADER tie layer was not able to be peeled off, which indicated that LOTADER improved the adhesion between PP and PLA. Without wishing to be limited by theory, LOTADER which has more functional groups (e.g., epoxy groups) than PP-g-GMA may can react to a greater extent with PLA. The increased reactivity of LOTADER would result in an increased amount of chemical bonding between PLA and the PP and an improved interlayer adhesion as seen in Sample 11.

Example 4

The peel strength of multi-layer films of the type described herein was investigated. A control sample, designated Sample 13, was prepared from 3371 which was coextruded with PLA to form 16 mil thick films having 14 mils of PP and 1.5 mils of PLA.

Three samples, designated Samples 14-16, were prepared and each had a PP layer of 14 mils, a tie layer of 0.5 mils, and a PLA layer of 1.5 mils thickness. Sample 14 was prepared from 3371 coextruded with PLA and a tie layer of PP-g-GMA. Sample 15 was prepared from 3371 coextruded with PLA and a tie layer of LOTADER AX8900. Sample 16, which was a comparative sample, was prepared from 3371 coextruded with PLA and a tie layer of POLYBOND 3200. Next, the peel strength of each sample was determined as described in Example 2. The components of each sample and the results of the peel strength tests are tabulated in Table 12.

TABLE 12

| | Coextruded Film (16 mil) | | | |
|---|---|---|---|---|
| Sample | PP (14 mils) | Tie Layer (0.5 mil) | PLA (1.5 mil) | Peel Strength (lbf/inch width) |
| 13 | 3371 | n/a | PLA 6201D | 0 |
| 14 | 3371 | PP-g-GMA | PLA 6201D | 0.2 |
| 15 | 3371 | LOTADER | PLA 6201D | 2.1 |
| 16 | 3371 | POLYBOND | PLA 6201D | 0 |

The results demonstrate that the film without any tie layer (Sample 13) and the film with POLYBOND as a tie layer (Sample 16) had a peel strength of 0 and were peeled off easily, similar to the results for Sample 9 and 12 from Example 3. Sample 14 having a PP-g-GMA tie layer displayed improved adhesion with a peel strength of 0.2 lbf per inch width. Sample 16 having a LOTADER tie layer displayed an even greater adhesion with a peel strength of 2.1 lb f per inch width.

The effect of orientation of the films on the adhesion of the layers was investigated. The films were biaxially oriented at 4×4 areal draw ratio at 30 m/min stretch speed. Again, the films prepared from Samples 13 and 16 were peeled off easily. Sample 14 was rumpled and was able to be peeled off. Sample 15 appeared as a single clear layer after bi-axial orientation and could not be peeled off even when the film was rumpled fiercely.

While embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96, percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present disclosure. The discussion of a reference is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A multi-layer film comprising:
a first layer wherein the first layer is a polylactic acid, and wherein the polylactic acid comprises poly-L-lactide, poly-D-lactide, or poly-LD-lactide; and
a second layer comprising polyethylene or polypropylene and a reactive modifier, wherein when the second layer comprises polypropylene, the polypropylene is a high crystallinity polypropylene homopolymer having a xylene soluble fraction of less than 1.5% as determined in accordance with ASTM D5492-98, a polypropylene heterophasic copolymer, or combinations thereof, and wherein the reactive modifier consists of one or more epoxy-functionalized polyolefins, wherein the epoxy-functionalized polyolefin is glycidyl methacrylate grafted polypropylene, polyethylene co glycidyl methacrylate, or combinations thereof, wherein if the epoxy-functionalized polyolefin is glycidyl methacrylate grafted polypropylene, the glycidyl methacrylate grafted polypropylene is prepared by grafting gycidyl methacrylate onto polypropylene in the presence of an initiator and a multi-functional acrylate comonomer.

2. The film of claim 1 further comprising a third layer comprising a polyolefin.

3. The film of claim 1 wherein the polylactic acid comprises poly-LD-lactide.

4. The film of claim 1 wherein the second layer comprises polyethylene, and wherein the polyethylene is high density polyethylene, low density polyethylene, linear low density polyethylene, or combinations thereof.

5. The film of claim 1 wherein:
the second layer comprises polyethylene, and
the reactive modifier is polyethylene co glycidyl methacrylate in an amount of from 0.5 wt. % to 15 wt. %, wherein the weight percentages are based on the total weight of the film.

6. The film of claim 1 wherein:
the second layer comprises polypropylene, and
the reactive modifier is glycidyl methacrylate grafted polypropylene in an amount of from 0.5 wt. % to 15 wt. %, wherein the weight percentages are based on the total weight of the film.

7. A multi-component fiber comprising the article of claim 1.

8. The multi-component fiber of claim 7 having a total linear mass density of from 1 to 20 denier per filament.

9. The multi-component fiber of claim 7 wherein:
the second component has a linear mass density of from 50% to 90% based on the total linear mass density of the multi-component fiber.

10. The multi-component fiber of claim 7 having a concentric sheath core, eccentric sheath core, or side by side configuration.

11. The multi-layer film of claim 1 having a total thickness of from 0.5 to 150 mils.

12. The multi-layer film of claim 1 further comprising a third layer comprising a polyolefin in the absence of the reactive modifier, wherein:
the third layer has a thickness of from 3% to 45% of the total thickness of the multi-layered film,
the second layer has a thickness of from 0.2% to 30% of the total thickness of the multi-layered film, and
the first layer has a thickness of from 1% to 50% of the total thickness of the multi-layered film.

13. The multi-layer film of claim 1 wherein the second layer is configured as a cap layer, a core layer, a tie layer, or combinations thereof.

14. The multi-layer film of claim 1 having peel strength between the first and second layers of equal to or greater than 0.01 pounds forced per inch width (lb f per inch width).

15. A method of preparing a multi-layer film comprising:
coextruding first and second film layers, wherein the first layer comprises a polylactic acid and the second layer comprises a polyolefin and a reactive modifier;
wherein the polylactic acid comprises poly-L-lactide, poly-D-lactide, or poly-LD-lactide;
wherein the polyolefin comprises polyethylene or polypropylene, wherein when the polyolefin comprises polypropylene, the polypropylene is a high crystallinity polypropylene homopolymer having a xylene soluble fraction of less than 1.5% as determined in accordance with ASTM D5492-98, a polypropylene heterophasic copolymer, or combinations thereof; and wherein the reactive modifier consists of one or more epoxy-functionalized polyolefins, wherein the epoxy-functionalized polyolefin is glycidyl methacrylate grafted polypropylene, polyethylene co glycidyl methacrylate, or combinations thereof, wherein if the epoxy-functionalized polyolefin is glycidyl methacrylate grafted polypropylene, the glycidyl methacrylate grafted polypropylene is prepared by grafting gycidlyl methacrylate onto polypropylene in the presence of an initiator and a multi-functional acrylate comonomer.

16. The method of claim 15 further comprising coextruding a third film layer with the first and second film layers, wherein the third layer comprises a polyolefin in the absence of the epoxy-functionalized polyolefin.

17. The multi-layer film of claim 1, wherein the epoxy-functionalized polyolefin is glycidyl methacrylate grafted polypropylene and wherein the glycidyl methacrylate grafted polypropylene is prepared by grafting gycidyl methacrylate onto polypropylene in the presence of an initiator and a multi-functional acrylate comonomer.

18. The multi-layer film of claim 17, wherein the multi-functional acrylate comonomer comprises polyethylene glycol diacrylate, trimethylolpropane triacrylate, or combinations thereof.

19. The multi-layer film of claim 18, wherein the multi-functional acrylate comonomer has a flashpoint of from 50° C. to 120° C., as measured by ASTM D93.

20. The multi-layer film of claim 1, wherein the high crystallinity polypropylene homopolymer has a xylene soluble fraction of less than 1.0%.

21. The multi-layer film of claim 1, wherein the high crystallinity polypropylene homopolymer has a xylene soluble fraction of less than 0.5%.

22. The multi-layer film of claim 1, wherein the high crystallinity polypropylene homopolymer has a meso pentads percentage of greater than 97%.

* * * * *